US011908229B2

(12) United States Patent
Mochizuki et al.

(10) Patent No.: US 11,908,229 B2
(45) Date of Patent: Feb. 20, 2024

(54) BIOMETRIC AUTHENTICATION DEVICE

(71) Applicant: Japan Display Inc., Tokyo (JP)

(72) Inventors: Kazuhide Mochizuki, Tokyo (JP); Takashi Nakamura, Tokyo (JP); Atsunori Oyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 178 days.

(21) Appl. No.: 17/646,754

(22) Filed: Jan. 3, 2022

(65) Prior Publication Data

US 2022/0215684 A1   Jul. 7, 2022

(30) Foreign Application Priority Data

Jan. 7, 2021 (JP) .................... 2021-001470

(51) Int. Cl.
| | |
|---|---|
| *G06V 40/13* | (2022.01) |
| *G06F 3/041* | (2006.01) |
| *G06V 40/145* | (2022.01) |
| *G06V 40/12* | (2022.01) |

(52) U.S. Cl.
CPC ...... *G06V 40/1318* (2022.01); *G06F 3/04164* (2019.05); *G06V 40/1365* (2022.01); *G06V 40/145* (2022.01)

(58) Field of Classification Search
CPC ........... G06V 40/1318; G06V 40/1365; G06V 40/145; G06F 3/04164
See application file for complete search history.

(56) References Cited

U.S. PATENT DOCUMENTS

| | | | |
|---|---|---|---|
| 2009/0028396 A1 | 1/2009 | Kishima | |
| 2010/0155578 A1* | 6/2010 | Matsumoto | ....... H01L 27/14678 250/216 |
| 2015/0311250 A1* | 10/2015 | Seo | ...... H10K 59/131 257/89 |
| 2019/0340409 A1* | 11/2019 | Zhu | ......... H10K 59/35 |
| 2021/0020810 A1* | 1/2021 | Lius | ...... H01L 33/483 |
| 2022/0012452 A1* | 1/2022 | Li | ......... H10K 59/353 |

FOREIGN PATENT DOCUMENTS

JP    2009-31903 A    2/2009

* cited by examiner

*Primary Examiner* — Edward F Urban
*Assistant Examiner* — Wassim Mahrouka
(74) *Attorney, Agent, or Firm* — Maier & Maier, PLLC

(57) ABSTRACT

According to one embodiment, a biometric authentication device includes a sensor and an illumination device. The sensor includes a first base material, a plurality of photoelectric conversion elements and a first control unit. The illumination device includes a second base material, a plurality of light emitting elements and a second control unit. Upon lighting the light emitting element at a predetermined position in the groups of the light emitting elements by the second control unit, the first control unit controls the operation of the photoelectric conversion elements so as to acquire a signal from the photoelectric conversion elements at predetermined positions of the groups of the photoelectric conversion elements.

14 Claims, 13 Drawing Sheets

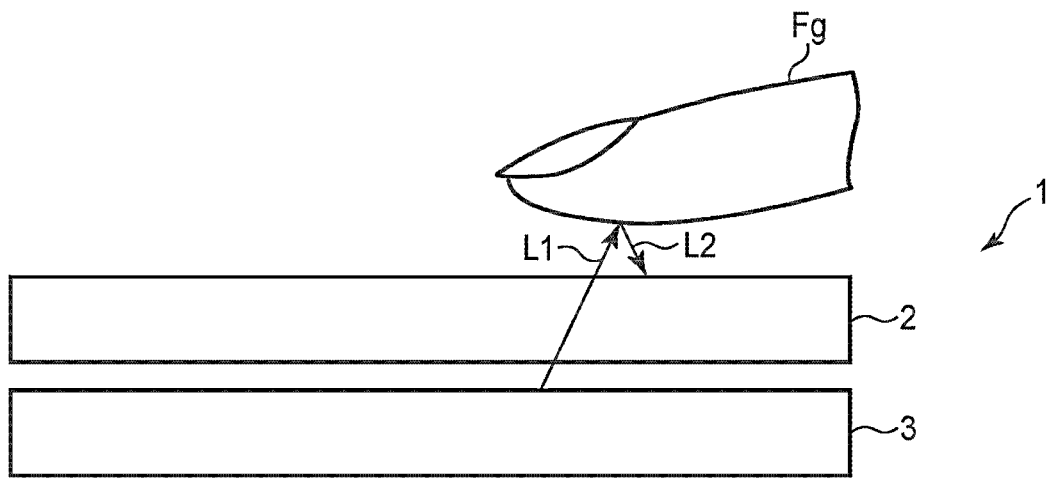
F I G. 1
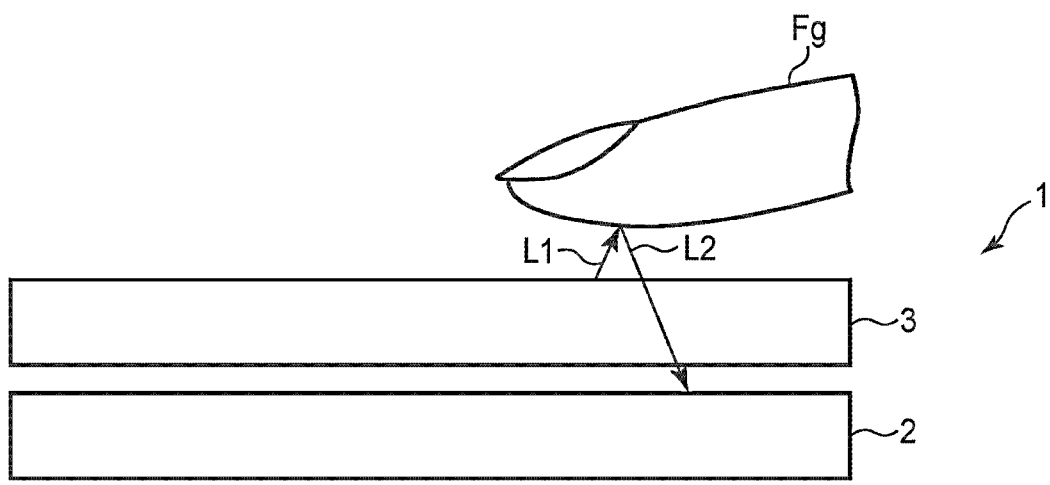
F I G. 2

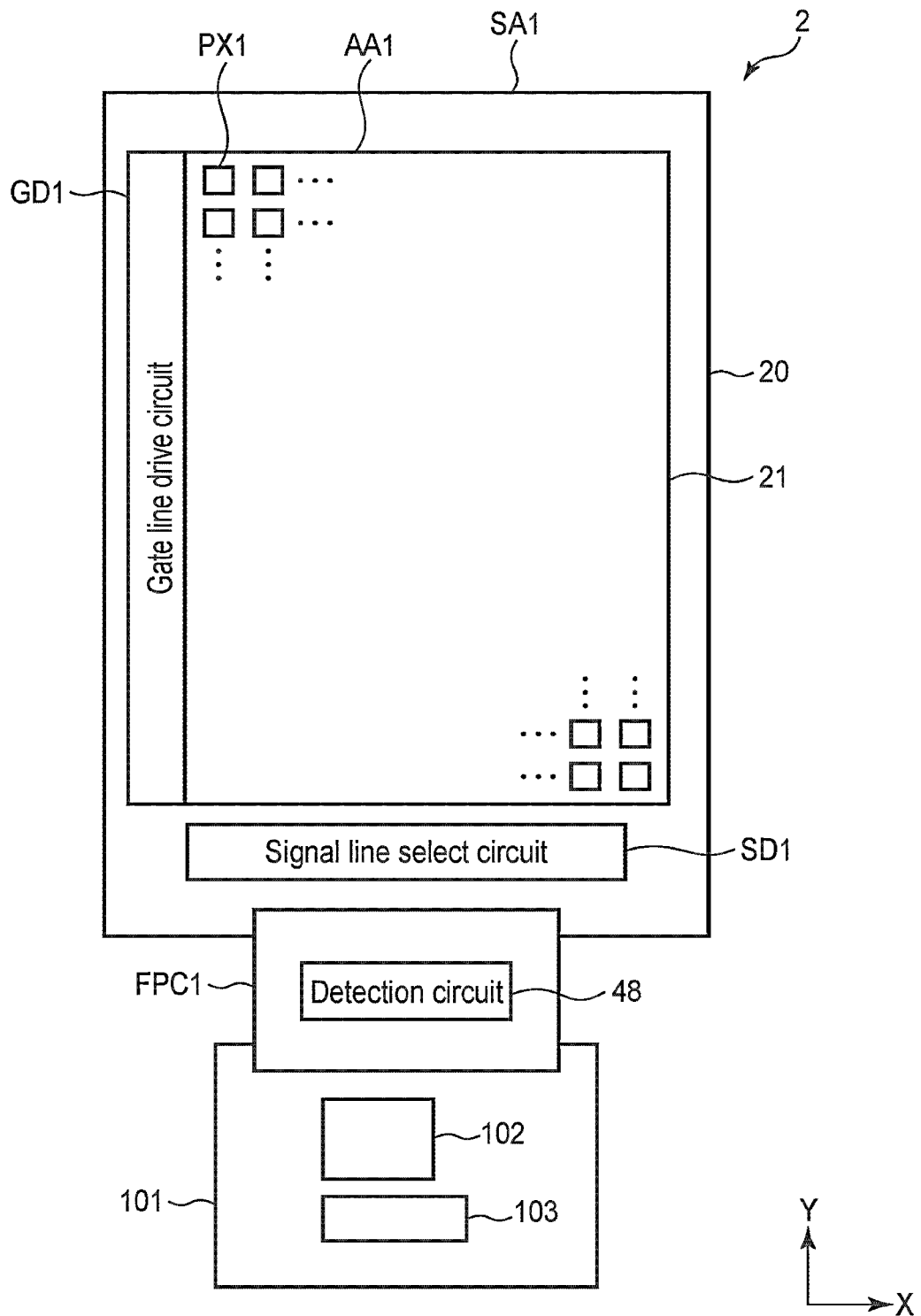
F I G. 3

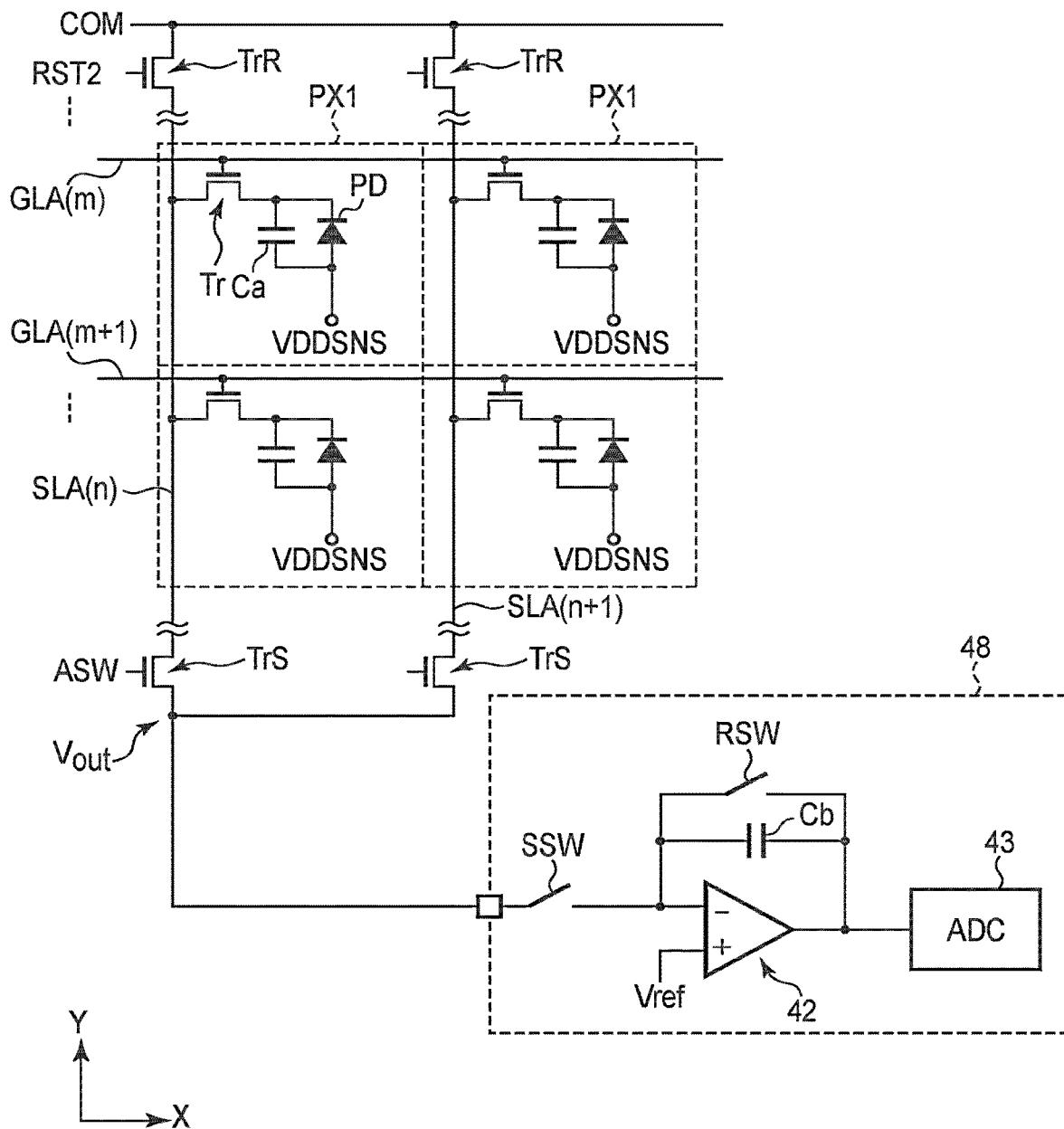
F I G. 6

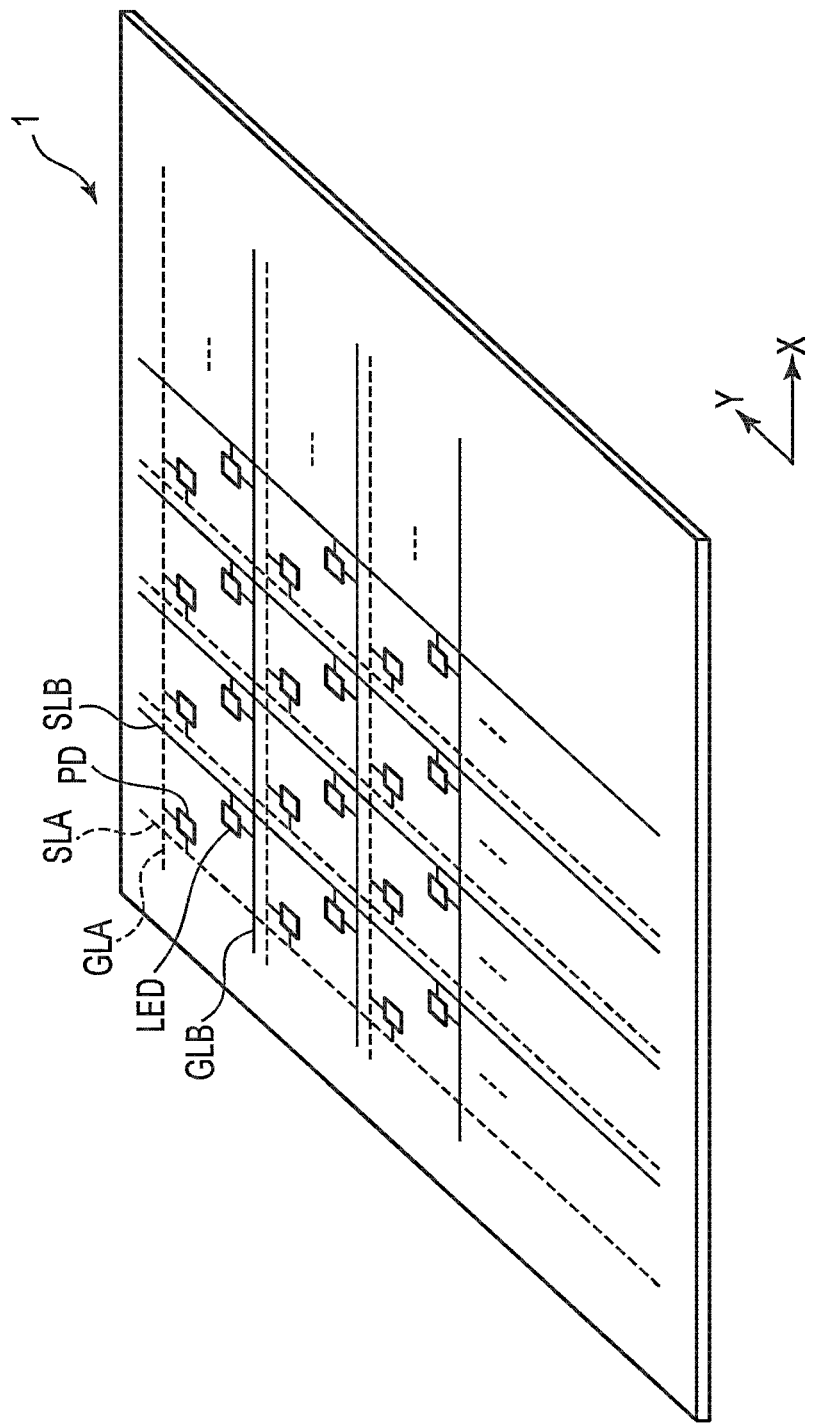
F I G. 12

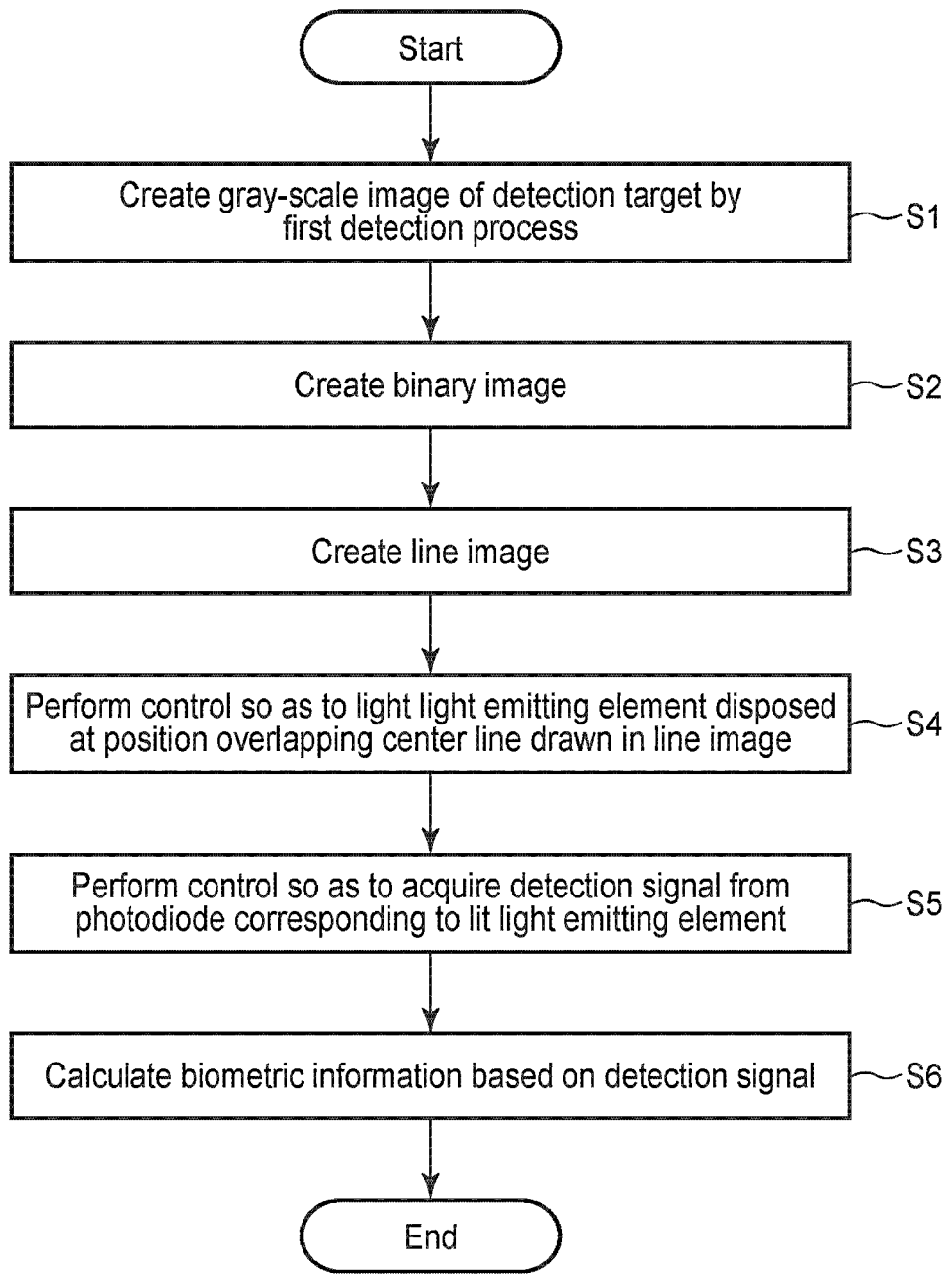
F I G. 13

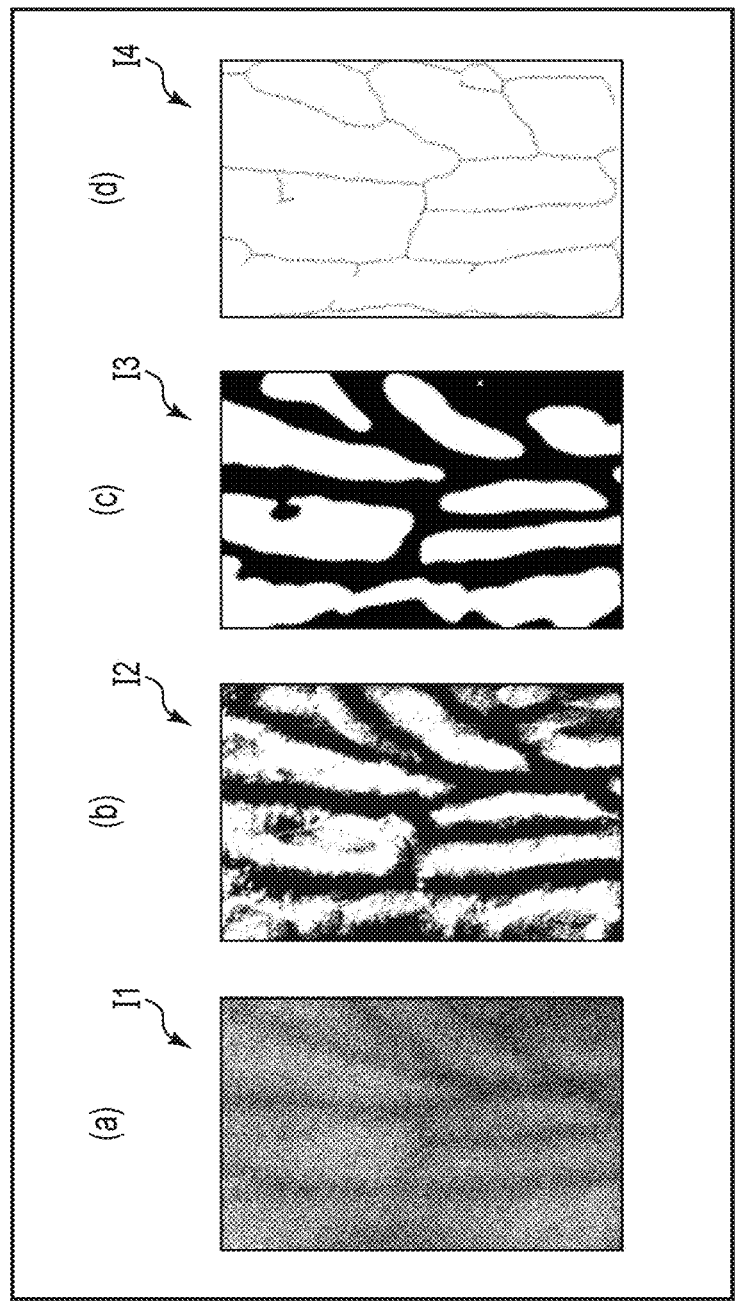
F I G. 14

BIOMETRIC AUTHENTICATION DEVICE

CROSS-REFERENCE TO RELATED APPLICATIONS

This application is based upon and claims the benefit of priority from Japanese Patent Application No. 2021-001470, filed Jan. 7, 2021, the entire contents of which are incorporated herein by reference.

FIELD

Embodiments described herein relate generally to a biometric authentication device.

BACKGROUND

In recent years, an optical biometric authentication device has been known as a biometric authentication device used for personal authentication and the like. For example, there is known a biometric authentication device in which a unit light source included in a light source is periodically lit by time division, and imaging operation by an imaging cell group located in the vicinity of the lit unit light source is stopped, whereas imaging operation is performed by an imaging cell group located in a distant place when viewed from the lit unit light source. According to this, it is possible to decreases the reception of reflected light that can be a noise component during the imaging operation.

However, there is room for improvement in the method of improving the S/N ratio of the signal output as a result of the imaging operation in the biometric authentication device.

BRIEF DESCRIPTION OF THE DRAWINGS

FIG. 1 is a cross-sectional view showing a schematic configuration example of the biometric authentication device according to the first embodiment.

FIG. 2 is a cross-sectional view showing another schematic configuration example of the biometric authentication device according to the first embodiment.

FIG. 3 is a plan view showing a configuration example of a sensor of the biometric authentication device according to the first embodiment.

FIG. 6 is a circuit diagram showing a circuit configuration example of a first pixel included in the sensor constituting the biometric authentication device according to the first embodiment.

FIG. 12 is a circuit diagram showing another configuration example of the biometric authentication device according to the first embodiment.

FIG. 13 is a flowchart showing a procedure example of a second detection process executed in a biometric authentication device according to a second embodiment.

FIG. 14 is a schematic diagram illustrating a second detection process executed in the biometric authentication device according to the second embodiment.

DETAILED DESCRIPTION

Figure 4:
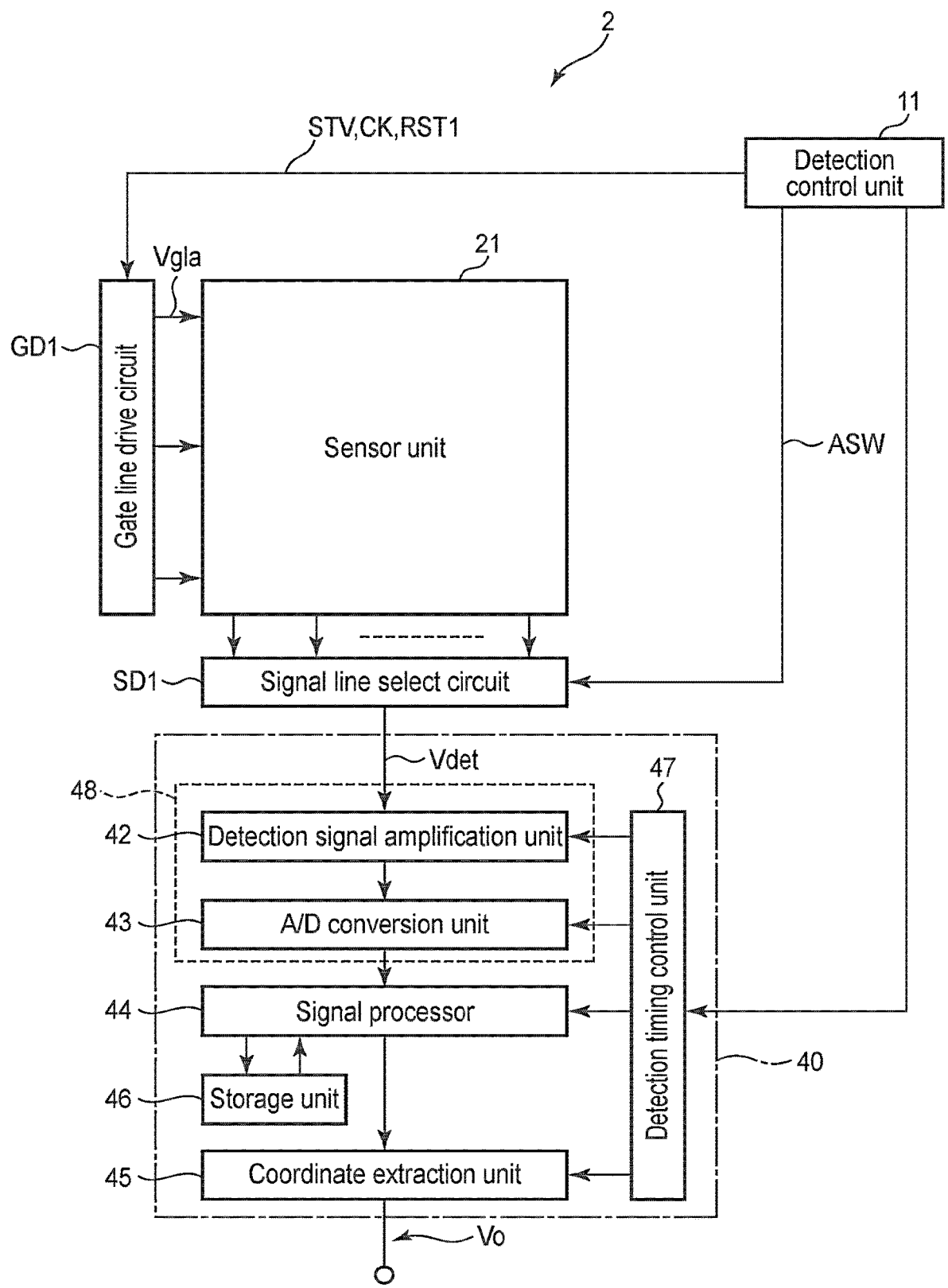
FIG. 4 is a block diagram showing a configuration example of the sensor of the biometric authentication device according to the first embodiment.

In general, according to one embodiment, a biometric authentication device includes a sensor and an illumination device. The sensor includes a first base material, a plurality of photoelectric conversion elements and a first control unit. The photoelectric conversion elements are arranged in a matrix on the first base material and output a signal according to an amount of received light. The first control unit controls an operation of the photoelectric conversion elements. The illumination device includes a second base material, a plurality of light emitting elements and a second control unit. The light emitting elements are arranged in a matrix on the second base material and apply light received by the photoelectric conversion elements. The second control unit controls an operation of the light emitting elements. The photoelectric conversion elements and the light emitting elements are divided into a plurality of groups corresponding to each other. Upon lighting the light emitting element at a predetermined position in the groups of the light emitting elements by the second control unit, the first control unit controls the operation of the photoelectric conversion elements so as to acquire a signal from the photoelectric conversion elements at predetermined positions of the groups of the photoelectric conversion elements, the positions corresponding to the lit light emitting element.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

FIG. 1 is a cross-sectional view showing a schematic configuration of a biometric authentication device 1 according to an embodiment. As shown in FIG. 1, the biometric authentication device 1 includes a sensor 2 and an illumination device 3, and the illumination device 3 and the sensor 2 are stacked in this order in a direction perpendicular to the surface of the sensor 2.

Light L1 applied from the illumination device 3 transmits the sensor 2. The sensor 2 is, for example, a light reflective optical sensor that detects light L2 reflected off the finger Fg to detect the biometric information of the finger Fg. Examples of the biometric information include a blood vessel image (vein pattern) such as a fingerprint or a vein, a pulse, a pulse wave, and a blood state (blood oxygen concentration and the like). The color of the light L1 from the illumination device 3 may be varied depending on the detection target. For example, in the case of fingerprint detection, the illumination device 3 can apply the light L1 that is visible light (e.g., blue or green), and in the case of vein detection, the illumination device 3 can apply the infrared light L1 that is infrared light.

Incidentally, FIG. 1 shows the biometric authentication device 1 having a configuration in which the illumination device 3 and the sensor 2 are stacked in this order in the direction perpendicular to the surface of the sensor 2. However, as shown in FIG. 2, the biometric authentication device 1 may have the illumination device 3 and the sensor 2 stacked in this order in the direction perpendicular to the surface of the sensor 2. In the case of this configuration, the light L1 applied from the illumination device 3 is reflected off the finger Fg, and the reflected light L2 is transmitted through the illumination device 3. The sensor 2 detects the light L2 reflected off the finger Fg and transmitted through the illumination device 3, and thus the biometric information of the finger Fg can be detected.

In addition, in FIGS. 1 and 2, the case in which the detection target (authentication target) is the finger Fg is shown. However, the detection target is not limited to this, and may be, for example, a palm or the like.

FIG. 3 is a plan view showing a configuration example of the sensor 2 of the biometric authentication device 1. As shown in FIG. 3, the sensor 2 includes a sensor base material 20, a sensor unit 21, a gate line drive circuit GD1, a signal line select circuit SD1, a detection circuit 48, a control circuit 102, and a power supply circuit 103.

To the sensor base material 20, a control board 101 is electrically connected through a flexible printed circuit board FPC1. The flexible printed circuit board FPC1 is provided with the detection circuit 48. The control board 101 is provided with the control circuit 102 and the power supply circuit 103. The control circuit 102 is, for example, a Field Programmable Gate Array (FPGA). The control circuit 102 supplies a control signal to the sensor unit 21, the gate line drive circuit GD1, and the signal line select circuit SD1 to control the detection operation of the sensor unit 21. The power supply circuit 103 supplies a voltage signal such as a sensor power supply signal VDDSNS (see FIG. 6) to the sensor unit 21, the gate line drive circuit GD1, and the signal line select circuit SD1.

The sensor base material 20 has a detection region AA1 and a peripheral region SA1. The detection region AA1 is a region provided with a plurality of first pixels PX1 constituting the sensor unit 21. The first pixel PX1 may be referred to as a sensor pixel or an imaging pixel. The plurality of first pixels PX1 is provided in a matrix in a first direction X and a second direction Y. The plurality of first pixels PX1 is each provided with a photodiode PD (see FIG. 6). The peripheral region SA1 is a region outside the detection region AA1 and is a region that does not overlap the first pixel PX1.

The gate line drive circuit GD1 and the signal line select circuit SD1 are provided in the peripheral region SA1. Specifically, the gate line drive circuit GD1 is provided in a region elongating along the second direction Y in the peripheral region SA1. The signal line select circuit SD1 is provided in a region elongating along the first direction X in the peripheral region SA1 and is provided between the sensor unit 21 and the detection circuit 48.

Incidentally, the first direction X is one direction in a plane parallel with the sensor base material 20. The second direction Y is one direction in a plane parallel with the sensor base material 20, and is a direction orthogonal to the first direction X. Incidentally, the second direction Y may intersect with the first direction X without being orthogonal to each other. In addition, the third direction Z is a direction orthogonal to the first direction X and the second direction Y, and is a normal direction of the sensor base material 20.

FIG. 4 is a block diagram showing a configuration example of the sensor 2 of the biometric authentication device 1. As shown in FIG. 4, the sensor 2 further includes a detection control unit 11 and a detector 40. A part or all of the functions of the detection control unit 11 are included in the control circuit 102. In addition, in the detectors 40, some or all of the functions other than the detection circuit 48 are included in the control circuit 102.

The sensor unit 21 is an optical sensor having the photodiode PD that is a photoelectric conversion element. The photodiode PD included in the sensor unit 21 outputs an electric signal according to the amount of light applied to the signal line select circuit SD1. The signal line select circuit SD1 sequentially selects a signal line SLA (see FIG. 5) according to a selection signal ASW from the detection control unit 11. As a result, the above-described electric signal is output to the detector 40 as a detection signal Vdet through the signal line select circuit SD1. In addition, the sensor unit 21 performs detection according to a gate drive signal Vgla supplied from the gate line drive circuit GD1.

The detection control unit 11 is a circuit that supplies control signals to the gate line drive circuit GD1, the signal line select circuit SD1, and the detector 40, and controls their operations. The detection control unit 11 supplies various control signals such as a start signal STV, a clock signal CK, and a reset signal RST1 to the gate line drive circuit GD1. In addition, the detection control unit 11 supplies various control signals such as the selection signal ASW to the signal line select circuit SD1.

The gate line drive circuit GD1 is a circuit that drives a plurality of gate lines GLA (see FIG. 5) based on various control signals. The gate line drive circuit GD1 sequentially or simultaneously selects a plurality of gate lines GLA and supplies the gate drive signal Vgla to the selected gate lines GLA. As a result, the gate line drive circuit GD1 selects a plurality of photodiodes PD connected to the gate line GLA.

Figure 5:
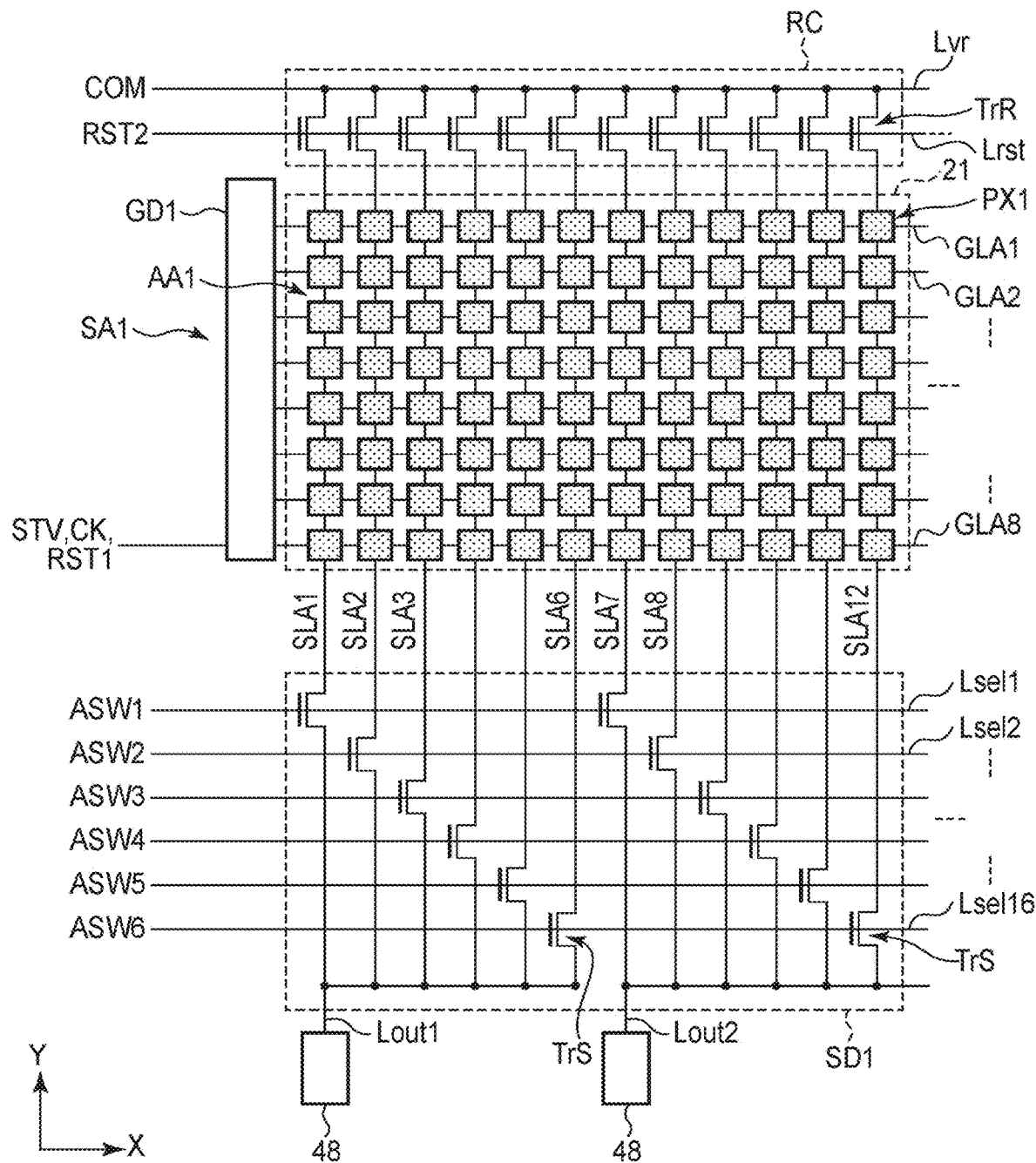
FIG. 5 is a circuit diagram showing a circuit configuration example of the sensor of the biometric authentication device according to the first embodiment.

The signal line select circuit SD1 is a switch circuit that sequentially or simultaneously selects a plurality of signal lines SLA (see FIG. 5). The signal line select circuit SD1 is, for example, a multiplexer. The signal line select circuit SD1 connects the selected signal line SLA to the detection circuit 48 based on the selection signal ASW supplied from the detection control unit 11. As a result, the signal line select circuit SD1 outputs the detection signal Vdet from the photodiode PD to the detector 40.

The detector 40 includes the detection circuit 48, a signal processor 44, a coordinate extraction unit 45, a storage unit 46, and a detection timing control unit 47. The detection timing control unit 47 controls the detection circuit 48, the signal processor 44, and the coordinate extraction unit 45 to operate in synchronization with each other based on the control signal supplied from the detection control unit 11.

The detection circuit 48 is, for example, an analog front end circuit (AFE). The detection circuit 48 is, for example, a signal processing circuit having the functions of a detection signal amplification unit 42 and an A/D conversion unit 43. The detection signal amplification unit 42 amplifies the detection signal Vdet. The A/D conversion unit 43 converts the analog signal output from the detection signal amplification unit 42 into a digital signal. Incidentally, in the following description, a signal amplified by the detection signal amplification unit 42, converted from an analog signal to a digital signal by the A/D conversion unit 43, and output is sometimes referred to as a detection signal Vdet.

The signal processor 44 is a logic circuit that detects a predetermined physical quantity input to the sensor unit 21 based on the output signal of the detection circuit 48. The signal processor 44 can detect unevenness (i.e., fingerprints) on the surface of the finger Fg based on the output signal from the detection circuit 48 in the case in which the finger Fg comes into contact with or is close to the detection region AA1.

The storage unit 46 temporarily stores the signal calculated by the signal processor 44. The storage unit may be, for example, a Random Access Memory (RAM), a register circuit, or the like.

The coordinate extraction unit 45 is a logic circuit that finds the detection coordinates of the unevenness of the surface of the finger Fg or the like when the signal processor 44 detects the contact or approach of the finger Fg. The coordinate extraction unit 45 combines the detection signal Vdet output from the photodiode PD of the sensor unit 21 to create information (e.g., images, and so on) that shows the shape of the unevenness (i.e., fingerprint) on the surface of the finger Fg and the shape of the blood vessel pattern of the finger Fg. This two-dimensional information is the biometric information of the user. Incidentally, the coordinate extraction unit 45 may output the detection signal Vdet as a sensor output Vo without calculating the detection coordinates. In this case, the detection signal Vdet may be referred to as the biometric information of the user. Alternatively, the coordinate extraction unit 45 may output information about the living body (e.g., pulse wave data, and so on) that can be calculated based on the detection signal Vdet as the sensor output Vo without calculating the detection coordinates. In this case, the information about the living body that can be calculated based on the detection signal Vdet may be referred to as the biometric information of the user.

Next, a circuit configuration example of the sensor 2 of the biometric authentication device 1 will be described. FIG. 5 is a circuit diagram showing the sensor 2. FIG. 6 is a circuit diagram showing a plurality of first pixels PX1 of the sensor 2. Incidentally, FIG. 6 also shows the circuit configuration of the detection circuit 48.

As shown in FIG. 5, the sensor unit 21 has a plurality of first pixels PX1 arranged in a matrix. The plurality of first pixels PX1 is each provided with the photodiode PD is provided.

The gate line GLA elongates in the first direction X and is connected to a plurality of first pixels PX1 arranged in the first direction X. In addition, a plurality of gate lines GLA1, GLA2, . . . , GLA8 are arranged in the second direction Y and is connected to the gate line drive circuit GD1. Incidentally, in the following description, in the case in which it is unnecessary to distinguish between the plurality of gate lines GLA1 to GLA8, the gate lines GLA1 to GLA8 are simply referred to as the gate line GLA. In addition, in FIG. 5, eight gate lines GLA are shown for easy understanding. However, this is merely an example, and M gate lines GLA may be arranged (M is 8 or more, e.g., M=256).

The signal line SLA elongates in the second direction Y and is connected to the photodiodes PD of the plurality of first pixels PX1 arranged in the second direction Y. In addition, a plurality of signal lines SLA1, SLA2, . . . , SLA12 is arranged in the first direction X and is connected to the signal line select circuit SD1 and the reset circuit RC. Incidentally, in the following description, in the case in which it is unnecessary to distinguish between the plurality of signal lines SLA1 to SLA12, the signal lines SLA1 to SLA12 are simply referred to as the signal line SLA. In addition, in FIG. 5, 12 signal line SLA are shown for easy understanding. However, this is merely an example, and N signal line SLA may be arranged (N is 12 or more, e.g., N=252).

Incidentally, in FIG. 5, the sensor unit 21 is provided between the signal line select circuit SD1 and the reset circuit RC. However, the present invention is not limited to this, and the sensor unit 21 may be connected to the signal line select circuit SD1 and the reset circuit RC at the ends of the signal lines SLA in the same direction.

The gate line drive circuit GD1 receives various control signals such as the start signal STV, the clock signal CK, and the reset signal RST1 from the control circuit 102. The gate line drive circuit GD1 sequentially selects a plurality of gate lines GLA1 to GLA8 in a time-division manner based on various control signals. The gate line drive circuit GD1 supplies the gate drive signal Vgla to the selected gate line GLA. As a result, the gate drive signal Vgla is supplied to a plurality of switching elements Tr connected to the gate line GLA, and the plurality of first pixels PX1 arranged in the first direction X is selected as targets for acquiring the detection signal Vdet.

Incidentally, the gate line drive circuit GD1 may be driven differently for each detection mode of fingerprint detection and a plurality of different pieces of biometric information (e.g., the pulse wave, pulse, blood vessel image, blood oxygen concentration, and so on).

The signal line select circuit SD1 has a plurality of selection signal lines Lse1, a plurality of output signal lines Lout, and a switching element TrS. The plurality of switching elements TrS is each provided corresponding to a plurality of signal lines SLA. The six signal lines SLA1 to SLA6 are connected to a common output signal line Lout1. The six signal lines SLA7 to SLA12 are connected to a common output signal line Lout2. The output signal lines Lout1 and Lout2 are connected to the detection circuit 48.

Here, the signal lines SLA1 to SLA6 are referred to as a first signal line block, and the signal lines SLA7 to SLA12 are referred to as a second signal line block. The plurality of selection signal lines Lse1 is each connected to the gate of the switching element TrS included in one signal line block. In addition, one selection signal line Lse1 is connected to the gate of the switching element TrS of a plurality of signal line blocks.

Specifically, the selection signal lines Lse11 to Lse16 are connected to the switching element TrS corresponding to the signal lines SLA1 to SLA6, respectively. In addition, the selection signal line Lse11 is connected to the switching element TrS corresponding to the signal line SLA1 and the switching element TrS corresponding to the signal line SLA7. The selection signal line Lse12 is connected to the switching element TrS corresponding to the signal line SLA2 and the switching element TrS corresponding to the signal line SLA8.

The control circuit 102 sequentially supplies the selection signal ASW to the selection signal line Lse1. As a result, the signal line select circuit SD1 sequentially selects the signal line SLA in one signal line block in a time-division manner by the operation of the switching element TrS. In addition, the signal line select circuit SD1 selects one signal line SLA for each of the plurality of signal line blocks. With such a configuration, the sensor 2 can decreases the number of Integrated Circuits (ICs) including the detection circuit 48 or the number of terminals of the ICs.

Here, an example is shown in which six signal lines SLA are connected to one output signal line Lout to form one signal line block. However, in regard how many signal lines SLA are connected to one output signal line Lout to form one signal line block, it is possible to freely set. For example, four signal lines SLA may be connected to one output signal line Lout to form one signal line block.

As shown in FIG. 5, the reset circuit RC includes a reference signal line Lvr, a reset signal line Lrst, and a switching element TrR. The switching element TrR is provided corresponding to the plurality of signal lines SLA. The reference signal line Lvr is connected to one of the source or drain of a plurality of switching elements TrR. The reset signal line Lrst is connected to the gate of the plurality of switching elements TrR.

The control circuit 102 supplies a reset signal RST2 to the reset signal line Lrst. As a result, the plurality of switching elements TrR is turned on, and the plurality of signal lines SLA is electrically connected to the reference signal line Lvr. The power supply circuit 103 supplies a reference signal COM to the reference signal line Lvr. As a result, the reference signal COM is supplied to the capacitive element Ca (see FIG. 6) included in the plurality of first pixels PX1.

As shown in FIG. 6, the first pixel PX1 includes the photodiode PD, the capacitive element Ca, and the switching element Tr. FIG. 6 shows two gate lines GLA (m) and GLA (m+1) arranged in the second direction Y among the plurality of gate lines GLA. In addition, among the plurality of signal lines SLA, two signal lines SLA (n) and SLA (n+1) arranged in the first direction X are shown. The first pixel PX1 is disposed in the region surrounded by the gate line GLA and the signal line SLA. The switching element Tr is provided corresponding to the photodiode PD. The switching element Tr is formed of a thin-film transistor, and in this example, the switching element Tr is formed of an n-channel Metal Oxide Semiconductor (MOS) Thin Film Transistor (TFT).

The gates of the switching elements Tr belonging to the plurality of first pixels PX1 arranged in the first direction X are connected to the gate line GLA. The sources of the switching elements Tr belonging to the plurality of first pixels PX1 arranged in the second direction Y are connected to the signal line SLA. The drain of the switching element Tr is connected to the cathode of the photodiode PD and the capacitive element Ca.

The sensor power supply signal VDDSNS is supplied from the power supply circuit 103 to the anode of the photodiode PD. In addition, to the signal line SLA and the capacitive element Ca, from the power supply circuit 103, the reference signal COM is supplied, which is the initial potential of the signal line SLA and the capacitive element Ca.

When light is applied to the first pixel PX1, a current corresponding to the amount of light is carried through the photodiode PD included in the first pixel PX1. As a result, electric charges are accumulated in the capacitive element Ca. Upon turning on the switching element Tr, a current is carried through the signal line SLA according to the electric charges accumulated in the capacitive element Ca. The signal line SLA is connected to the detection circuit 48 through the switching element TrS of the signal line select circuit SD1. As a result, the sensor 2 can detect a signal corresponding to the amount of light applied to the photodiode PD for each first pixel PX1.

In the detection circuit 48, a switch SSW is turned on during a read period, and the detection circuit 48 is connected to the signal line SLA. The detection signal amplification unit 42 of the detection circuit 48 converts the fluctuation in the current supplied from the signal line SLA into the fluctuation in the voltage and amplifies the fluctuation. To a non-inverting input unit (+) of the detection signal amplification unit 42, a reference potential (Vref) having a fixed potential is input, and to an inverting input terminal (−), the signal line SLA is connected. Here, a signal the same as the reference signal COM is input as the reference potential (Vref). In addition, the detection signal amplification unit 42 has a capacitive element Cb and a reset switch RSW. In a reset period after the read period, the reset switch RSW is turned on and the electric charges of the capacitive element Cb are reset.

Figure 7:
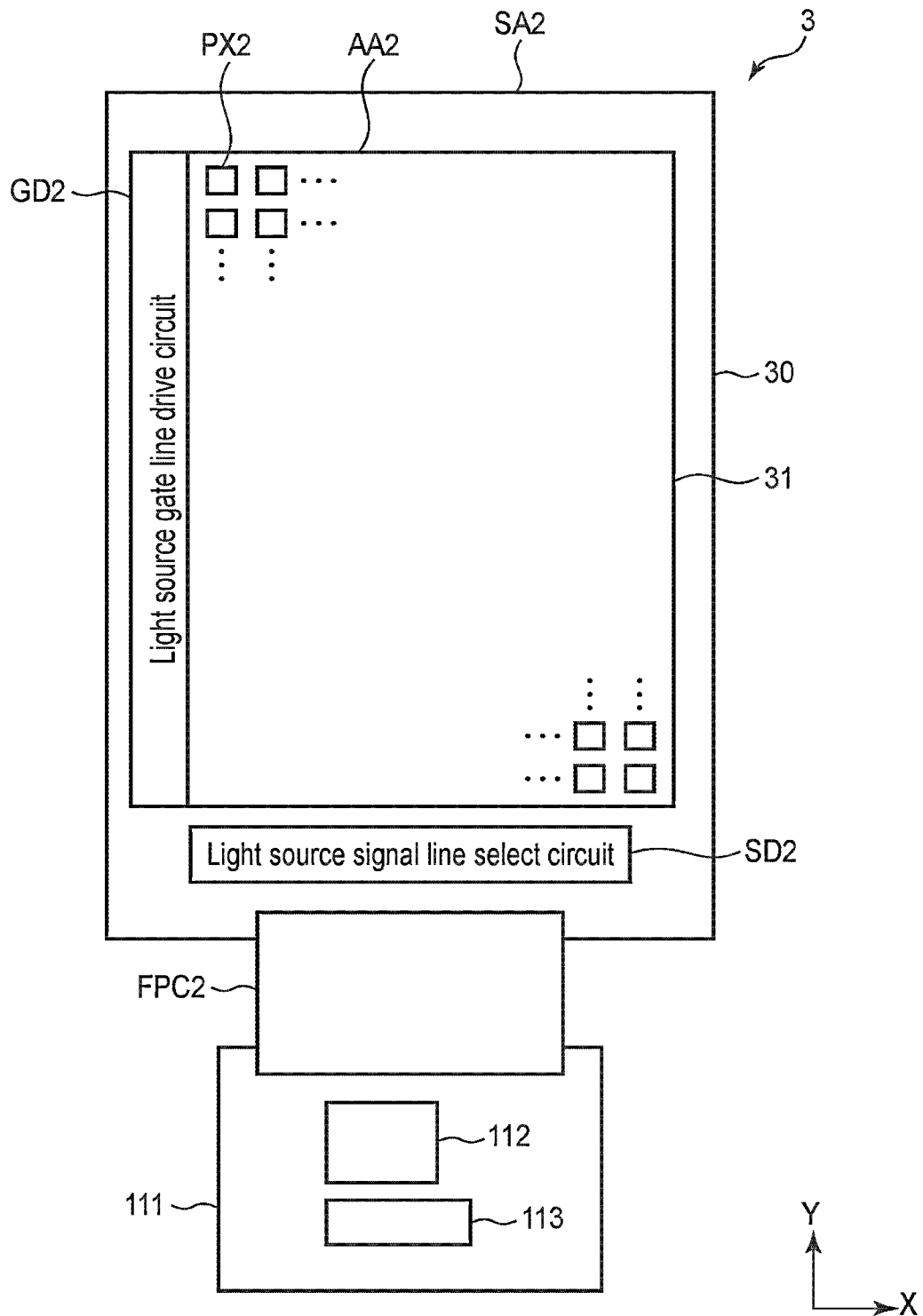
FIG. 7 is a plan view showing a configuration example of an illumination device of the biometric authentication device according to the first embodiment.

Next, the illumination device 3 of the biometric authentication device 1 will be described. FIG. 7 is a plan view showing a configuration example of the illumination device 3 of the biometric authentication device 1. The illumination device 3 includes a light source base material 30, a light emitting unit 31, a light source gate line drive circuit GD2, a light source signal line select circuit SD2, a control circuit 112, and a power supply circuit 113.

To the light source base material 30, a control board 111 is electrically connected through a flexible printed circuit board FPC2. The control board 111 is provided with the control circuit 112 and the power supply circuit 113. The control circuit 112 is, for example, an FPGA. The control circuit 112 supplies a control signal to the light emitting unit 31, the light source gate line drive circuit GD2, and the light source signal line select circuit SD2, and controls the lighting operation of the plurality of light emitting elements LED included in the light emitting unit 31. The power supply circuit 103 supplies a voltage signal such as a light source power supply signal to the light emitting unit 31, the light source gate line drive circuit GD2, and the light source signal line select circuit SD2.

The light source base material 30 has a light emitting region AA2 and a peripheral region SA2. In the case of the biometric authentication device 1 having the configurations shown in FIGS. 1 and 2, the light emitting region AA2 of the light source base material 30 overlaps the detection region AA1 of the sensor base material 20 in planar view. In addition, the peripheral region SA2 of the light source base material 30 overlaps the peripheral region SA1 of the sensor base material 20 in planar view. The light emitting region AA2 is a region provided with a plurality of second pixels PX2 constituting the light emitting unit 31. The plurality of second pixels PX2 is provided in a matrix in the first direction X and the second direction Y. The plurality of second pixels PX2 is each provided with the light emitting element LED (see FIG. 8). The light emitting element LED is, for example, a micro LED or a mini LED, and applies light toward the finger Fg that is a detection target. The peripheral region SA2 is a region outside the light emitting region AA2 and is a region that does not overlap the second pixel PX2.

The light source gate line drive circuit GD2 and the light source signal line select circuit SD2 are provided in the peripheral region SA2. Specifically, the light source gate line drive circuit GD2 is provided in a region elongating along the second direction Y in the peripheral region SA2. The light source signal line select circuit SD2 is provided in a region elongating along the first direction X in the peripheral region SA2.

The light source gate line drive circuit GD2 is a circuit that drives a plurality of light source gate lines GLB (see FIG. 8) based on various control signals. The light source gate line drive circuit GD2 sequentially or simultaneously selects the plurality of light source gate lines GLB and supplies a gate drive signal to the selected light source gate line GLB. As a result, the light source gate line drive circuit GD2 selects the plurality of light emitting elements LED connected to the light source gate line GLB.

Figure 8:
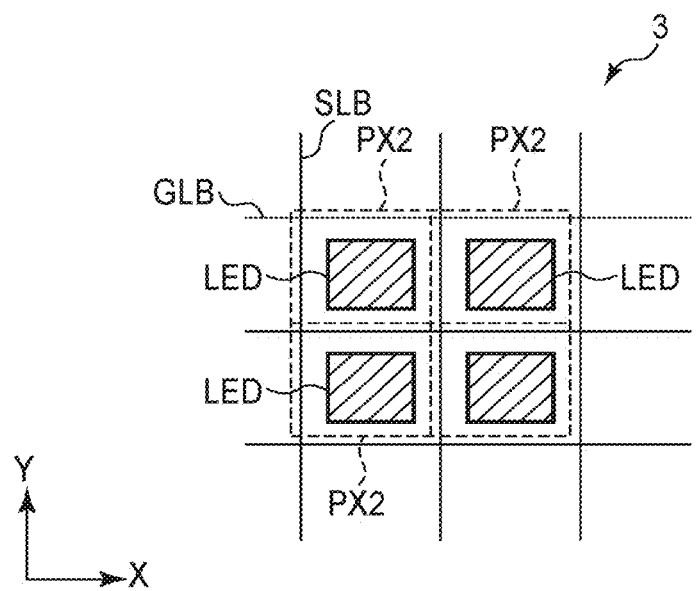
FIG. 8 is a plan view showing a circuit configuration example of a second pixel of the illumination device constituting the biometric authentication device according to the first embodiment.

The light source signal line select circuit SD2 is a switch circuit that sequentially or simultaneously selects the plurality of light source signal lines SLB (see FIG. 8). The light source signal line select circuit SD2 is, for example, a multiplexer. The light source signal line select circuit SD2 sequentially or simultaneously selects a plurality of light source signal lines SLB, and supplies a selection signal to the selected light source signal line SLB. As a result, the light source signal line select circuit SD2 selects one or a plurality of light emitting elements LED among the plurality of light emitting elements LED selected by the light source gate line drive circuit GD2.

As shown in FIG. 8, the second pixel PX2 is disposed in the region surrounded by the light source gate line GLB and the light source signal line SLB. The plurality of second pixels PX2 each elongates along the first direction X and are connected to the light source gate lines GLB elongating along the first direction X being arranged in the second direction Y with spacings and to the light source signal line SLB elongating along the second direction Y being arranged in the first direction X with spacings. The light emitting elements LED included in the plurality of second pixels PX2 is selectively lit by the control signals supplied from the light source gate line drive circuit GD2 and the light source signal line select circuit SD2.

Here, a process for detecting biometric information (in the following, simply referred to as a detection process) executed in a general biometric authentication device will be described. In a general detection process, first, a plurality of light emitting elements provided in the illumination device is lit at the same time, and the plurality of light emitting elements applies the finger or palm of the detection target with light. The light applied from the plurality of light emitting elements is diffusely reflected off the finger or palm of the detection target. After that, a plurality of photodiodes provided in the sensor receives the light diffusely reflected off the finger or palm of the detection target, and outputs a detection signal according to the amount of the received light. As a result, it is possible that the biometric authentication device detects biometric information based on detection signals from the plurality of photodiodes.

Figure 9:
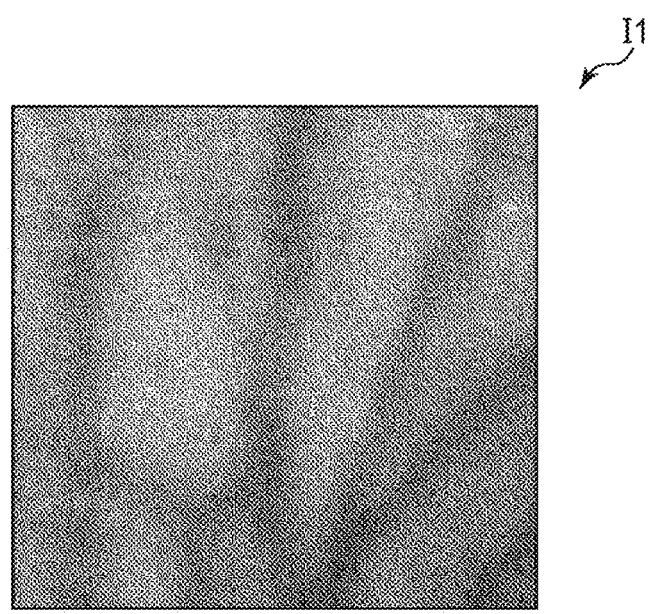
FIG. 9 is a schematic diagram showing an image of a detection target created by a general detection process.

However, in the above-described general detection process, since the plurality of light emitting elements provided in the illumination device is lit all at once, each of the plurality of photodiodes provided in the sensor may receive a mixture of a plurality of beams of light diffusely reflected at various positions on the finger that is a detection target or the palm. According to this, this causes a problem that the S/N ratio of the detection signals from the plurality of photodiodes is degraded. In addition, when the S/N ratio of the detection signal is degraded, a problem also arises that accurate detection of a temporal change in biometric information (e.g., pulse wave data) fails. Further, when the S/N ratio of the detection signal is degraded, for example, even though an image based on the detection signal is created, a blurred image I1 with low contrast is created as shown in FIG. 9.

Therefore, in the biometric authentication device 1 according to the present embodiment, the control circuit 112 of the illumination device 3 has a function that divides the plurality of second pixels PX2 provided in the illumination device 3 into a plurality of groups and controls the operations of the light source gate line drive circuit GD2 and the light source signal line select circuit SD2 such that only the light emitting element LED included in the second pixels PX2 located at a predetermined position is lit.

In addition, the control circuit 102 of the sensor 2 has a function that divides the plurality of first pixels PX1 provided in the sensor 2 into a plurality of groups, and controls the operations of the gate line drive circuit GD1 and the signal line select circuit SD1 such that only the detection signal Vdet is acquired from the photodiode PD included in the first pixel PX1 at a predetermined position in each group.

Incidentally, the control circuit 112 of the illumination device 3 and the control circuit 102 of the sensor 2 operate in synchronization with each other. In addition, here, it is assumed that the number of pixels of the plurality of second pixels PX2 provided in the illumination device 3 is the same as the number of pixels of the plurality of first pixels PX1 provided in the sensor 2, and it is assumed that the second pixels PX2 by the control circuit 112 of the illumination device 3 are grouped corresponding to grouping the grouping of the first pixels PX1 by the control circuit 102 of the sensor 2 (the area of one group of the second pixels PX2 is the same as the area of one group of the first pixels PX1 and one group of the first pixels PX1 is present for one group of the second pixels PX2).

Figure 10:
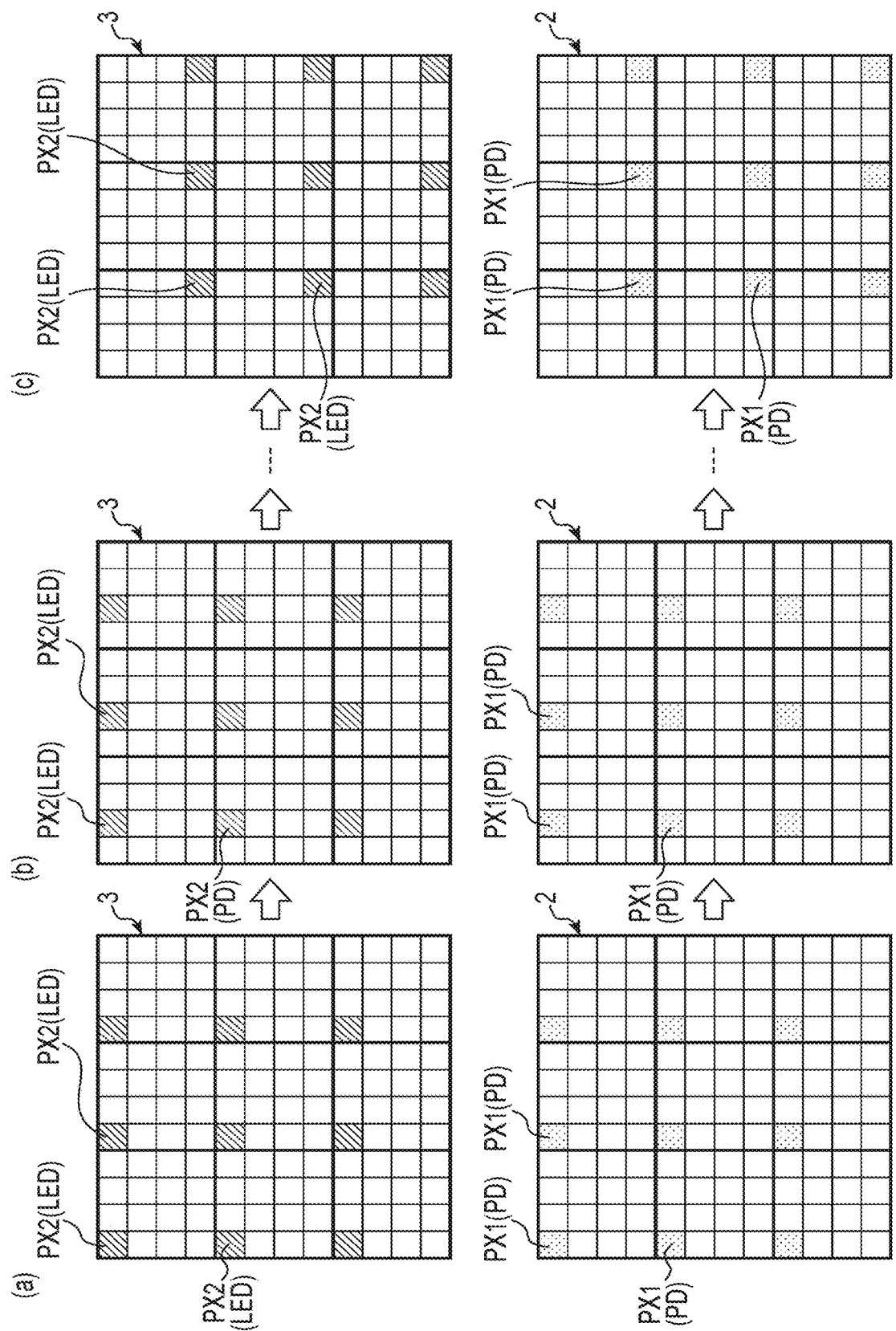
FIG. 10 is a schematic diagram illustrating a first detection process executed in the biometric authentication device according to the first embodiment.

FIG. 10 is a schematic diagram illustrating the above-described function of the control circuit 112 of the illumination device 3 and the above-described function of the control circuit 102 of the sensor 2. FIG. 10 shows the case in which the plurality of second pixels PX2 provided in the illumination device 3 and the plurality of first pixels PX1 provided in the sensor 2 are both grouped into 16 pixels in four by four. Incidentally, in the following, a series of processes described with reference to FIG. 10 is referred to as a first detection process.

As shown in the upper part of (a) of FIG. 10, the control circuit 112 of the illumination device 3 controls the operations of the light source gate line drive circuit GD2 and the light source signal line select circuit SD2 such that the light emitting elements LED included in the second pixels PX2 located in the first column of the first row of each group (in the following, referred to as the first light emitting element LED) are lit all at once. At this time, the light emitting elements LED included in the other second pixels PX2 of each group (i.e., 15 second pixels PX2 located in the second column of the first row to the fourth column of the fourth row) are not lit and remain off. According to this, as shown in the upper part of (a) of FIG. 10, only the first light emitting element LED of each group is lit.

In synchronization with the timing when the first light emitting element LED of each group of the illumination device 3 is lit, the control circuit 102 of the sensor 2 controls the operations of the gate line drive circuit GD1 and the signal line select circuit SD1 such that the detection signal Vdet is acquired all at once from the photodiode PD included in the first pixels PX1 located in the first column of the first row of each group (in the following, referred to as the first photodiode PD). At this time, no detection signal Vdet is acquired from the photodiode PD included in the other first pixel PX1 of each group (i.e., 15 first pixels PX1 located in the second column of the first row to the fourth column of the fourth row). According to this, as shown in the lower part of (a) of FIG. 10, only the detection signal Vdet is acquired from the first photodiode PD of each group. The acquired detection signal Vdet is stored in the storage unit 46.

Next, as shown in the upper part of (b) of FIG. 10, the control circuit 112 of the illumination device 3 controls the operations of the light source gate line drive circuit GD2 and the light source signal line select circuit SD2 such that the first light emitting element LED of each group is turned off and the light emitting elements LED included in the second pixel PX2 located in the second column of the first row of each group (in the following, referred to as a second light emitting element LED) are lit all at once. At this time, the light emitting elements LED included in the other second pixels PX2 of each group (i.e., 15 second pixels PX2 located in the first column of the first row and the third column of the first row to the fourth column of the fourth row) are not lit and remain off. According to this, as shown in the upper part of (b) of FIG. 10, only the second light emitting element LED of each group is lit.

In synchronization with the timing when the second light emitting element LED of each group of the illumination device 3 is lit, the control circuit 102 of the sensor 2 controls the operations of the gate line drive circuit GD1 and the signal line select circuit SD1 such that the detection signal Vdet is acquired all at once from the photodiode PD included in the first pixels PX1 located in the second column of the first row of each group (in the following, referred to as a second photodiode PD). At this time, no detection signal Vdet is acquired from the photodiode PD included in the other first pixels PX1 of each group (i.e., 15 first pixels PX1 located in the first column of the first row and the third column of the first row to the fourth column of the fourth row). According to this, as shown in the lower part of (b) of FIG. 10, the detection signal Vdet is acquired only from the second photodiode PD of each group. The acquired detection signal Vdet is stored in the storage unit 46.

In the following, the control circuit 112 of the illumination device 3 executes the similar control for the light emitting element LED included in the second pixels PX2 located in the third column of the first row and the fourth column of the first row, and the control circuit 102 of the sensor 2 executes the similar control for the photodiode PD included in the first pixels PX1 located in the third column of the first row and the fourth column of the first row.

After executing the control on the first column of the first row to the fourth column of the first row (the columns of the first row) of each group, the control circuit 112 of the illumination device 3 and the control circuit 102 of the sensor 2 execute the similar control on the columns of the subsequent row. In other words, the control circuit 112 of the illumination device 3 executes the similar control for the light emitting element LED included in the second pixels PX2 located in the first column of the second row to the fourth column of the second row, and the control circuit 102 of the sensor 2 executes the similar control for the photodiode PD included in the first pixels PX1 located in the first column of the second row to the fourth column of the second row.

In addition, after executing the control on the first column of the second row to the fourth column of the second row (the columns of the second row) of each group, the control circuit 112 of the illumination device 3 and the control circuit 102 of the sensor 2 further execute the similar control on the columns of the subsequent row. In other words, the control circuit 112 of the illumination device 3 executes the similar control for the light emitting element LED included in the second pixels PX2 located in the first column of the third row to the fourth column of the third row, and the control circuit 102 of the sensor 2 executes the similar control for the photodiode PD included in the first pixels PX1 located in the first column of the third row to the fourth column of the third row.

Further, after executing the control on the first column of the third row to the fourth column of the third row (the columns of the third row) of each group, the control circuit 112 of the illumination device 3 and the control circuit 102 of the sensor 2 further execute the similar control on the columns of the subsequent row. In other words, the control circuit 112 of the illumination device 3 executes the similar control for the light emitting element LED included in the second pixels PX2 located in the first column of the fourth row to the fourth column of the fourth row, and the control circuit 102 of the sensor 2 executes the similar control for the photodiode PD included in the first pixels PX1 located in the first column of the fourth row to the fourth column of the fourth row. In the following, the control executed for the fourth column of the fourth row of each group will be described in detail with reference to (c) of FIG. 10.

As shown in the upper part of (c) of FIG. 10, the control circuit 112 of the illumination device 3 controls the operations of the light source gate line drive circuit GD2 and the light source signal line select circuit SD2 such that the fifteenth light emitting element LED of each group is turned off and the light emitting elements LED included in the second pixel PX2 located in the fourth column of the fourth row of each group (in the following, referred to as a sixteenth light emitting element LED) are lit all at once. At this time, the light emitting elements LED included in the other second pixels PX2 of each group (i.e., 15 second pixels PX2 located in the first column of the first row to the third column of the fourth row) are not lit and remain off. According to this, as shown in the upper part of (c) of FIG. 10, only the sixteenth light emitting element LED of each group is lit.

In synchronization with the timing when the sixteenth light emitting element LED of each group of the illumination device 3 is lit, the control circuit 102 of the sensor 2 controls the operations of the gate line drive circuit GD1 and the signal line select circuit SD1 such that the detection signal Vdet is acquired all at once from the photodiode PD included in the first pixels PX1 located in the fourth column of the fourth row of each group (in the following, referred to as a sixteenth photodiode PD). At this time, no detection signal Vdet is acquired from the photodiode PD included in the other first pixels PX1 of each group (i.e., 15 first pixels PX1 located in the first column of the first row to the third column of the fourth row. According to this, as shown in the lower part of (c) of FIG. 10, the detection signal Vdet is acquired only from the sixteenth photodiode PD of each group. The acquired detection signal Vdet is stored in the storage unit 46.

When the series of controls as described above is executed and the detection signal Vdet acquired from the first to sixteenth photodiodes PD of each group is stored in the storage unit 46, the coordinate extraction unit 45, which is one function of the control circuit 102 of the sensor 2, creates an image I2 (see FIG. 11) showing the shape of the blood vessel pattern of the finger Fg that is a detection target based on the detection signal Vdet of the first to sixteenth photodiodes PD of each group stored in the storage unit 46.

In the first detection process executed in the biometric authentication device 1 according to the embodiment described above, the plurality of second pixels PX2 provided in the illumination device 3 and the plurality of first pixels PX1 provided in the sensor 2 are divided into pluralities of groups corresponding to each other. Then, in the illumination device 3, one light emitting element LED per group is controlled to be lit. In other words, the light emitting elements LED other than one of the plurality of light emitting elements LED included in each group are controlled to be turned off. According to this, it is possible to suppress the incidence of the light from other light emitting elements LED included in each group as stray light into the photodiode PD that operates in synchronization with the lit light emitting element LED.

In addition, in the first detection process executed in the biometric authentication device 1 according to the present embodiment, one light emitting element LED is controlled to be lit for each group, and the light emitting elements LED are grouped such that a light emitting element LED that is lit in one group is sufficiently apart from a light emitting elements LED that is lit in the group adjacent to the one group (e.g., in FIG. 10, the light emitting elements LED are grouped being separated by four pixels). Therefore, it is possible to mainly enter the light from the nth light emitting element LED of each group that overlaps in planar view to the nth photodiode PD of each group. In other words, according to the first detection process according to the present embodiment, it is possible to suppress the incidence of the light from the nth light emitting element LED of another group, which does not overlap in planar view, to the nth photodiode PD of each group as stray light.

Figure 11:
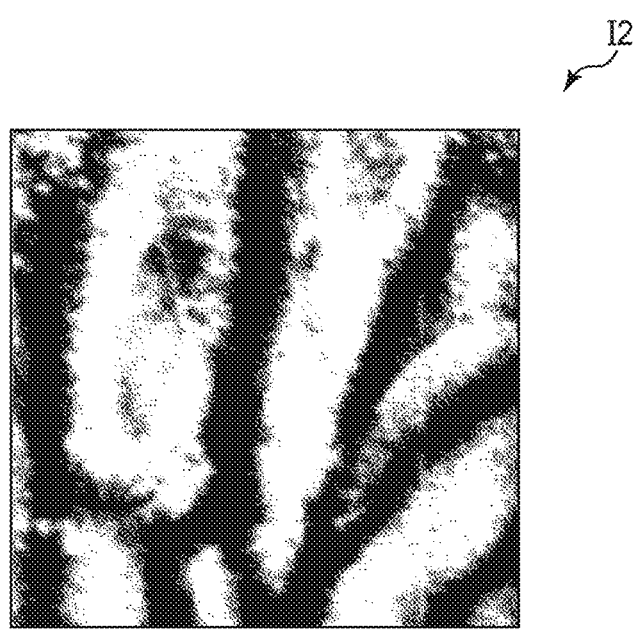
FIG. 11 is a schematic diagram showing an image of a detection target created by the first detection process executed in the biometric authentication device according to the first embodiment.

As described above, by suppressing the incidence of stray light into a plurality of photodiodes PD, it is possible to suppress a degradation in the S/N ratio of the detection signal Vdet from the plurality of photodiodes PD. According to this, the biometric authentication device 1 according to the present embodiment can create the image I2 showing the shape of a blood vessel pattern as shown in FIG. 11, for example, as compared with the above-described general biometric authentication device. Therefore, it is possible to create an image with high contrast.

Incidentally, in the present embodiment, it is assumed that the plurality of second pixels PX2 provided in the illumination device 3 and the plurality of first pixels PX1 provided in the sensor 2 are grouped into 16 pixels in four by four. However, grouping the second pixels PX2 and the first pixels PX1 by how many number of pixels is not limited to this. The second pixels PX2 and the first pixels PX1 may be grouped by a given number of pixels as long as the light emitting element LED that is lit in one group is separated from the light emitting element LED that is lit in the adjacent group such that the light from the light emitting element LED that is lit in the one group does not enter, as stray light, the photodiode PD that overlaps the light emitting element LED that is lit in the adjacent group in planar view.

In addition, in the present embodiment, the case is described in which the number of pixels of the plurality of second pixels PX2 provided in the illumination device 3 and the number of pixels of the plurality of first pixels PX1 provided in the sensor 2 are the same. However, the number is not limited to this. The number of pixels of the second pixel PX2 provided in the illumination device 3 may be different from the number of pixels of the first pixel PX1 provided in the sensor 2.

For example, the first pixel PX1 of the sensor 2 may be disposed at a pitch of 235 μm, while the second pixel PX2 of the illumination device 3 may be disposed at a pitch of 100 μm. In other words, the number of pixels of the second pixel PX2 of the illumination device 3 may be larger than the number of pixels of the first pixel PX1 of the sensor 2. However, even in this case, desirably, one group of the first pixel PX1 and one group of the second pixel PX2 have the same area (i.e., although the number of pixels included in one group is different, the area of a group is the same).

In this case, the control circuit 112 of the illumination device 3 controls the operations of the light source gate line drive circuit GD2 and the light source signal line select circuit SD2 so as to light the light emitting elements LED included in the plurality of the second pixels PX2 corresponding to one of the plurality of first pixels PX1 provided in the sensor 2 (i.e., the plurality of second pixels PX2 overlapping one first pixel PX1 in planar view).

The control circuit 102 of the sensor 2 controls the operations of the gate line drive circuit GD1 and the signal line select circuit SD1 such that in synchronization with the timing at which the light emitting elements LED included in the plurality of second pixels PX2 provided in the illumination device 3 are lit, the detection signal Vdet is acquired from the photodiode PD included in the first pixel PX1 corresponding to the plurality of second pixels PX2 including the lit light emitting elements LED.

Even in such a configuration, only the light emitting elements LED included in one region for each group are controlled to be lit, and the light emitting elements LED in the other regions are controlled to be turned off, and thus it is possible to suppress the incidence of the light from the light emitting element LED included in the other regions of each group, as stray light, into the photodiode PD that operates in synchronization with the light emitting element LED.

In addition, there is no change in grouping that the region in which the light emitting element LED is lit in one group is sufficiently separated from the region in which the light emitting element LED is lit in the group adjacent to the one group. Thus, it is also possible to suppress the incidence of the light from the light emitting element LED lit in the group adjacent to the one group, as stray light, into the photodiode PD corresponding to the region in which the light emitting element LED is lit in one group.

In other words, even in the case in which the number of pixels of the first pixel PX1 provided in the sensor 2 is different from the number of pixels of the second pixel PX2 provided in the illumination device 3, it is possible to suppress the incidence of stray light into the plurality of photodiodes PD by the series of the first detection processes, it is possible to suppress the degradation in the S/N ratio of the detection signals Vdet from the plurality of photodiodes PD, and by extension, it is also possible to create a high contrast image based on the detection signal Vdet.

In addition, in the present embodiment, the control of the first pixel PX1 and the second pixel PX2 in each group is sequentially executed from the first column of the first row to the fourth column of the first row, from the first column of the second row to the fourth column of the second row, from the first column of the third row to the fourth column of the third row, and from the first column of the fourth row to the fourth column of the fourth row. However, the order of the control of the first pixel PX1 and the second pixel PX2 is not limited.

In the present embodiment described above, the biometric authentication device 1 having a configuration is described in which the sensor 2 and the illumination device 3 are stacked (a configuration in which the sensor 2 and the illumination device 3 are provided on separate substrates). However, the present embodiment is not limited to this. The biometric authentication device 1 may have a configuration in which the sensor 2 and the illumination device 3 are provided on the same substrate.

FIG. 12 is a circuit diagram showing a circuit configuration example of the biometric authentication device 1 in which the photodiode PD of the sensor 2 and the light emitting element LED of the illumination device 3 are provided on the same substrate. In this case, as shown in FIG. 12, the gate lines GLA that select the photodiode PD elongates along the first direction X and are arranged with spacings in the second direction Y. In addition, the signal lines SLA that select the photodiode PD elongates along the second direction Y and are arranged with spacings in the first direction X. The light source gate line GLB that selects the light emitting element LED elongates in a direction parallel with the gate line GLA that selects the photodiode PD. In addition, the light source signal line SLB that selects the light emitting element LED elongates in a direction parallel with the signal line SLA that selects the photodiode PD. In this case, the region surrounded by the gate line GLA, the light source gate line GLB, the signal line SLA, and the light source signal line SLB corresponds to one pixel.

Even in such a configuration, the biometric authentication device 1 operates so that a plurality of pixels arranged in a matrix is grouped and one light emitting element LED is lit for each group, and the detection signal Vdet is acquired from one photodiode PD included in the same pixel as the lit light emitting element LED. In other words, even in the case in which the sensor 2 and the illumination device 3 are provided on the same substrate, it is possible to suppress the incidence of stray light into the plurality of photodiodes PD by the series of first detection processes. Therefore, it is possible to suppress a degradation in the S/N ratio of the detection signal Vdet from the plurality of photodiodes PD, and by extension, it is also possible to create a high-contrast image based on the detection signal Vdet.

According to the first embodiment described above, in the biometric authentication device 1, the light emitting elements LED included in the plurality of second pixels PX2 provided in the illumination device 3 are simultaneously lit, and no detection signal Vdet is simultaneously acquired from the photodiode PD included in the plurality of the first pixels PX1 provided in the sensor 2. Instead, by the series of first detection processes, the first pixels PX1 and the second pixels PX2 are grouped, only the light emitting element LED included in the second pixel PX2 at the predetermined position of each group is lit, and the detection signal Vdet is acquired only from the photodiode PD included in the first pixel PX1 corresponding to the second pixel PX2 including the lit light emitting element LED.

According to this, it is possible to suppress the incidence of stray light into a plurality of photodiodes PD, it is possible to suppress a degradation in the S/N ratio of the detection signal Vdet from the plurality of photodiodes PD, and by extension, it is also possible to create a high-contrast image based on the above-described detection signal Vdet.

Second Embodiment

Next, a second embodiment will be described. In the above-described first embodiment, the first detection process capable of improving the contrast of the image created based on the detection signal Vdet from the photodiode PD is mainly described. However, in the present embodiment, a detection process (in the following, referred to as a second detection process) will be described in which a temporal change in biometric information (e.g., pulse wave data) calculated based on a detection signal Vdet from a photodiode PD can be accurately detected.

Incidentally, since the configuration of a biometric authentication device 1 is the similar as that of the first embodiment described above, the detailed description will be omitted here, and the second detection process will be mainly described below.

FIG. 13 is a flowchart showing a procedure example of the second detection process executed in the biometric authentication device 1 according to the present embodiment.

First, when the biometric authentication device 1 detects contact or approach of a detection target such as a finger Fg, a sensor 2 and an illumination device 3 constituting the biometric authentication device 1 create an image of the detection target by the first detection process shown in the first embodiment (Step S1). Here, it is assumed that a gray-scale image I2 shown in (b) of FIG. 14 is created by the process in Step S1.

Subsequently, a control circuit 102 of the sensor 2 creates a binarized image of the image created by the process in Step S1 (Step S2). According to this, the control circuit 102 can obtain, for example, a binarized image I3 shown in (c) of FIG. 14.

Subsequently, the control circuit 102 of the sensor 2 extracts the center line of the black portion of the binarized image created by the process in Step S2, and creates an image in which only the extracted center line is drawn (Step S3). According to this, the control circuit 102 can obtain, for example, a line image I4 shown in (d) of FIG. 14.

When the line image shown in (d) of FIG. 14 is created by the control circuit 102 of the sensor 2, a control circuit 112 of the illumination device 3 controls the operations of a light source gate line drive circuit GD2 and a light source signal line select circuit SD2 so as to light the light emitting element LED included in a second pixel PX2 disposed at a position overlapping the center line drawn in the line image (Step S4).

Incidentally, here, it is assumed that the control circuit 102 of the sensor 2 and the control circuit 112 of the illumination device 3 operate in synchronization with each other and can share information with each other by exchanging signals. According to this, as shown in the process in Step S4, the control circuit 112 of the illumination device 3 makes reference to the line image I4 created by the control circuit 102 of the sensor 2, and the second pixel PX2 that lights the light emitting element LED.

The control circuit 102 of the sensor 2 controls the operations of the gate line drive circuit GD1 and the signal line select circuit SD1 so as to acquire the detection signal Vdet from the photodiode PD included in the first pixel PX1 corresponding to the second pixel PX2 including the lit light emitting element LED (more specifically, the first pixel PX1 overlapping the second pixel PX2 including the lit light emitting element LED in planar view) (Step S5).

After that, the control circuit 102 of the sensor 2 calculates biometric information (pulse wave data) based on the acquired detection signal Vdet (Step S6), and ends the series of second detection processes here. Such a series of second detection processes is repeatedly executed, it is possible to accurately detect a temporal change in the biometric information calculated based on the detection signal Vdet.

According to the second embodiment described above, in the biometric authentication device 1, the binarized image I3 is created based on the gray-scale image I2, which is a high-contrast image, by the second detection process described above, the line image I4 is created based on the binarized image I3, only the light emitting element LED included in the second pixel PX2 disposed at a position overlapping the center line drawn on the line image I4 is lit, and the detection signal Vdet is acquired only from the photodiode PD included in the first pixel PX1 corresponding to the second pixel PX2 including the lit light emitting element LED.

According to this, the light of the light emitting element LED can be applied only to the position at which the object (e.g., a vein) of the biometric information to be calculated passes, and thus, for example, it is possible to improve the S/N ratio of the detection signal Vdet obtained from the photodiode PD, compared with the case in which the light emitting element LED provided in the illumination device 3 are fully lit. As a result, it is possible to also detect a temporal change accurately in the biometric information calculated based on the detection signal Vdet.

Figure 15:
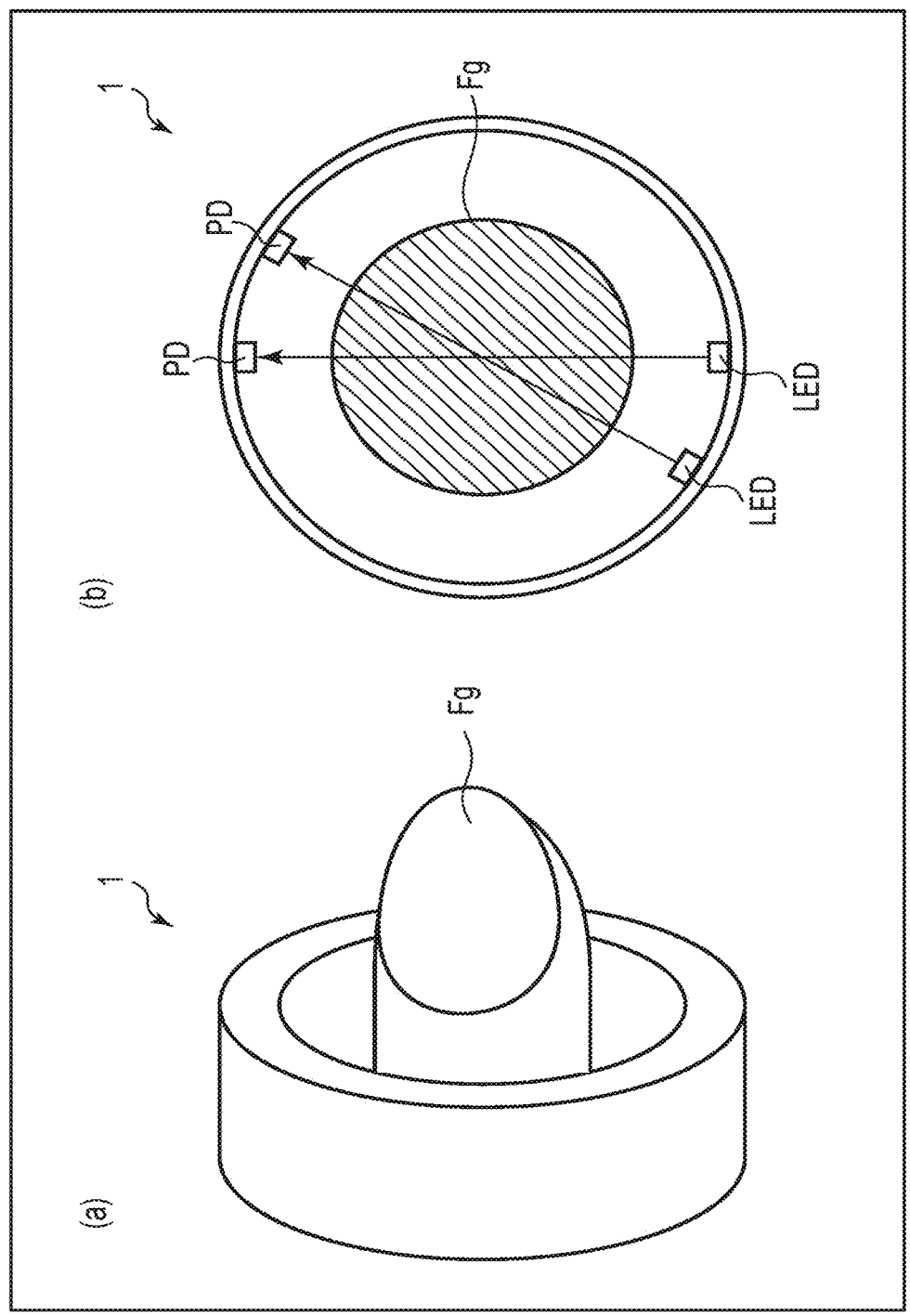
FIG. 15 is a schematic diagram showing another shape example of the biometric authentication device.

In the first and second embodiments described above, as shown in FIGS. 1 and 2, it is assumed that the biometric authentication device 1 has a flat plate shape. However, the shape of the biometric authentication device 1 is not limited to this, and the shape may be a ring shape, for example, as shown in (a) of FIG. 15. In this case, as shown in (a) of FIG. 15, the finger Fg is placed in the ring of the ring-shaped biometric authentication device 1, and thus, as shown in (b) of FIG. 15, it is possible to detect the light applied from the light emitting element LED toward the finger Fg at the photodiodes PD disposed opposed to the light emitting element LED. Even in such a configuration, the first and second detection processes described above are executed, and thus it is possible to obtain the similar effects as those shown in the first and second embodiments described above. In addition, since the biometric authentication device 1 is in a ring shape and the light emitting element LED and the photodiode PD are disposed around the ring, it is possible to calculate the detection coordinates of both sides of the finger Fg (the front surface of finger Fg (surface on the fingerprint side) and the back side (surface of the nail), and by extension, it is possible to also create three-dimensional information (a three-dimensional image).

According to at least one embodiment described above, it is possible to provide the biometric authentication device 1 capable of improving the S/N ratio of the detection signal Vdet output in the biometric authentication device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A biometric authentication device comprising:
   a sensor including a first base material, a plurality of photoelectric conversion elements that are arranged in a matrix on the first base material and that output a signal according to an amount of received light, and a first control unit that controls an operation of the photoelectric conversion elements; and
   an illumination device including a second base material, a plurality of light emitting elements that are arranged in a matrix on the second base material and that apply light received by the photoelectric conversion elements, and a second control unit that controls an operation of the light emitting elements, wherein
   the photoelectric conversion elements and the light emitting elements are divided into a plurality of groups corresponding to each other,
   upon lighting the light emitting element at a predetermined position in the groups of the light emitting elements by the second control unit, the first control unit controls the operation of the photoelectric conversion elements so as to acquire a signal from the photoelectric conversion elements at predetermined positions of the groups of the photoelectric conversion elements, the positions corresponding to the lit light emitting element,
   the sensor further includes:
      a plurality of first gate lines elongating along a first direction, the first gate lines being arranged with a spacing in a second direction intersecting with the first direction,
      a plurality of first signal lines elongating along the second direction, the first signal lines being arranged with a spacing in the first direction,
      a first gate line drive circuit connected to the first gate lines, and
      a first signal line select circuit connected to the first signal lines;
   the illumination device further includes:
      a plurality of second gate lines elongating along the first direction, the second gate lines being arranged with a spacing in the second direction,
      a plurality of second signal lines elongating along the second direction, the second signal lines being arranged with a spacing in the first direction,
      a second gate line drive circuit connected to the second gate lines, and
      a second signal line select circuit connected to the second signal lines;
   the photoelectric conversion elements are provided in a region surrounded by the first gate line and the first signal line,
   the light emitting elements are provided in a region surrounded by the second gate line and the second signal line,
   the first control unit controls the operation of the photoelectric conversion elements by controlling the operation of the first gate line drive circuit and the first signal line select circuit, and
   the second control unit controls the operation of the light emitting elements by controlling the operation of the second gate line drive circuit and the second signal line select circuit.

2. The biometric authentication device of claim 1, wherein
   the lit light emitting element overlaps the photoelectric conversion element at a position corresponding to the lit light emitting element in planar view.

3. The biometric authentication device of claim 1, wherein
   the second control unit controls the operation of the light emitting elements so as to sequentially light so that the light emitting elements included in the groups of the light emitting elements as the light emitting elements at the predetermined positions.

4. The biometric authentication device of claim 1, wherein
a number of a plurality of light emitting elements included in the groups of the light emitting elements is equal to a number of a plurality of photoelectric conversion elements included in the group of the photoelectric conversion elements, and one light emitting element is disposed so as to overlap one photoelectric conversion element in planar view.

5. The biometric authentication device of claim 1, wherein
a number of a plurality of light emitting elements included in the groups of the light emitting elements is different from a number of a plurality of photoelectric conversion elements included in the group of the photoelectric conversion elements, and a plurality of light emitting elements is disposed so as to overlap one photoelectric conversion element in planar view.

6. The biometric authentication device of claim 1, wherein
the first control unit creates a first image showing an authentication target based on signals acquired from the photoelectric conversion elements.

7. The biometric authentication device of claim 6, wherein
the first control unit creates a second image in which the first image is binarized based on the created first image, and creates a third image in which a center line of a black portion of the second image alone is drawn based on the created second image, and
the second control unit controls the operation of the light emitting elements so as to light light emitting elements disposed at positions overlapping the center line drawn in the third image created by the first control unit.

8. The biometric authentication device of claim 1, wherein
the photoelectric conversion element is a photodiode, and the light emitting element is a micro LED.

9. A biometric authentication device comprising:
a sensor including a first base material, a plurality of photoelectric conversion elements that are arranged in a matrix on the first base material and that output a signal according to an amount of received light, and a first control unit that controls an operation of the photoelectric conversion elements; and
an illumination device including a second base material, a plurality of light emitting elements that are arranged in a matrix on the second base material and that apply light received by the photoelectric conversion elements, and a second control unit that controls an operation of the light emitting elements, wherein
the photoelectric conversion elements and the light emitting elements are divided into a plurality of groups corresponding to each other,
upon lighting the light emitting element at a predetermined position in the groups of the light emitting elements by the second control unit, the first control unit controls the operation of the photoelectric conversion elements so as to acquire a signal from the photoelectric conversion elements at predetermined positions of the groups of the photoelectric conversion elements, the positions corresponding to the lit light emitting element,
the first control unit creates a first image showing an authentication target based on signals acquired from the photoelectric conversion elements,
the first control unit creates a second image in which the first image is binarized based on the created first image, and creates a third image in which a center line of a black portion of the second image alone is drawn based on the created second image, and
the second control unit controls the operation of the light emitting elements so as to light light emitting elements disposed at positions overlapping the center line drawn in the third image created by the first control unit.

10. The biometric authentication device of claim 9, wherein
the lit light emitting element overlaps the photoelectric conversion element at a position corresponding to the lit light emitting element in planar view.

11. The biometric authentication device of claim 9, wherein
the second control unit controls the operation of the light emitting elements so as to sequentially light so that the light emitting elements included in the groups of the light emitting elements as the light emitting elements at the predetermined positions.

12. The biometric authentication device of claim 9, wherein
a number of a plurality of light emitting elements included in the groups of the light emitting elements is equal to a number of a plurality of photoelectric conversion elements included in the group of the photoelectric conversion elements, and one light emitting element is disposed so as to overlap one photoelectric conversion element in planar view.

13. The biometric authentication device of claim 9, wherein
a number of a plurality of light emitting elements included in the groups of the light emitting elements is different from a number of a plurality of photoelectric conversion elements included in the group of the photoelectric conversion elements, and a plurality of light emitting elements is disposed so as to overlap one photoelectric conversion element in planar view.

14. The biometric authentication device of claim 9, wherein
the photoelectric conversion element is a photodiode, and the light emitting element is a micro LED.

* * * * *